(12) United States Patent
Volden et al.

(10) Patent No.: US 12,181,050 B2
(45) Date of Patent: Dec. 31, 2024

(54) RING WITH RECIRCULATING GROOVES FOR DRY GAS SEAL

(71) Applicant: John Crane Inc., Morton Grove, IL (US)

(72) Inventors: Douglas J. Volden, Park Ridge, IL (US); Syed K. Niamathullah, Glenview, IL (US)

(73) Assignee: JOHN CRANE INC., Morton Grove, IL (US)

( * ) Notice: Subject to any disclaimer, the term of this patent is extended or adjusted under 35 U.S.C. 154(b) by 0 days.

(21) Appl. No.: 18/210,290

(22) Filed: Jun. 15, 2023

(65) Prior Publication Data

US 2023/0407971 A1 Dec. 21, 2023

Related U.S. Application Data

(60) Provisional application No. 63/352,309, filed on Jun. 15, 2022.

(51) Int. Cl.
*F16J 15/34* (2006.01)

(52) U.S. Cl.
CPC ............... *F16J 15/3404* (2013.01)

(58) Field of Classification Search
CPC ...... F16J 15/34; F16J 15/3404; F16J 15/3408; F16J 15/3412; F16J 15/3416
See application file for complete search history.

(56) References Cited

U.S. PATENT DOCUMENTS

| 2012/0018957 | A1* | 1/2012 | Watanabe | F16J 15/441 |
| | | | | 277/387 |
| 2020/0182299 | A1* | 6/2020 | Kimura | F16C 17/026 |
| 2020/0182356 | A1* | 6/2020 | Itadani | F16J 15/3284 |
| 2022/0099191 | A1* | 3/2022 | Suzuki | F16C 33/103 |
| 2023/0151848 | A1* | 5/2023 | Imura | F16J 15/3412 |
| | | | | 384/123 |

FOREIGN PATENT DOCUMENTS

| EP | 3889474 A1 | 10/2021 |
| EP | 3901497 A1 | 10/2021 |
| EP | 3922871 A1 | 12/2021 |
| WO | WO-2014174725 A1 * | 10/2014 ............. F16J 15/162 |

OTHER PUBLICATIONS

Notification of Transmittal of the International Search Report and the Written Opinion of the International Searching Authority, or the Declaration; PCT/IB2023/056223; Oct. 4, 2023, 16 pages.

* cited by examiner

*Primary Examiner* — Gilbert Y Lee
(74) *Attorney, Agent, or Firm* — CANTOR COLBURN LLP

(57) ABSTRACT

A mating ring for use in a dry gas seal and a dry gas seal. The mating ring includes a face that defines an inner diameter and an outer diameter. The face includes: a channel formed therein disposed between the inner diameter and the outer diameter; one or more inlet channels formed in the face that extend from the inner diameter to the channel; and one or more spiral grooves in fluid communication with the channel that extend from the channel toward the inner diameter. Alternatively, the one or more inlet channels can extend from the outer diameter to the channel and one or more spiral grooves can extend from the channel toward the outer diameter.

24 Claims, 4 Drawing Sheets

RING WITH RECIRCULATING GROOVES FOR DRY GAS SEAL

CROSS REFERENCE TO RELATED APPLICATIONS

This application claims the benefit of an earlier filing date from U.S. Provisional Application Ser. No. 63/352,309 filed Jun. 15, 2022, the entire disclosure of which is incorporated herein by reference.

FIELD

Exemplary embodiments pertain to the art of dry gas seals and, in particular, to a seal face that includes recirculating grooves.

BACKGROUND

There are several types of seals that can be used to provide a seal between a rotating shaft and a stationary housing of a pump, compressor, turbine, or other rotating machine. These include, for example, mechanical seals and dry gas seals.

In particular, in cases where a gas is being pumped, compressed, blown or the like, a non-contact or "gas" seal can be used. An example of such a seal is dry gas seal. Dry gas seals are typically used to seal centrifugal compressors that are often used in transportation and distribution of gasses such as natural gas. For instance, in a natural gas pipeline, compressors may be located at set intervals to boost the gas pressure for processing, to counter the effect of flow losses along the transmission pipelines, and to generally keep the gas moving towards its destination. Like mechanical seals, dry gas seals include two rings that define the faces rotate relative to one another.

The rotating ring is sometimes referred to as a "mating ring" as it is mated to the rotating shaft/rotor. The rotating ring can be mated to the rotor via a shaft sleeve. The stationary ring can sometimes be referred to as the primary ring and does not rotate during operation.

In operation, a layer of gas is developed between the two rings that forms a seal while allowing the rings to move relative to one another without contacting each other. The gas layer is formed from process or sealing gas injected into the dry gas seal. Grooves in the rotating (mating) ring draw the gas from an outer radial edge of the mating ring to a location in between the two rings. The gas that is drawn into the grooves is compressed as is moves toward the radially inward ends (or tips) of the grooves. The compressed gas creates a pressure dam that causes the primary ring to "lift off" from the mating ring to form a running gap that is in the range of few microns (e.g., 3-10 µm). Similar to the above, to allow for relative axial movement between the rings, the primary ring is typically mounted to a stationary portion of the dry gas seal by a compressible member such as a spring or other implement. After liftoff, a very small amount of the process gas flows over the dam area to the low pressure side of the seal (e.g., outside of the compressor), creating a controlled seal leakage, and the rings operate on the thin film of gas as a non-contacting seal.

In some cases, however, it is not acceptable to allow process gas to flow through the seal an out to the atmosphere.

SUMMARY

Disclosed in one embodiment is a non-contacting seal. The non-contacting (or dry gas) seal can be used as a stand-alone seal or in combination with a primary seal as a containment or "back-up" seal.

In one embodiment, the seal is adapted for arrangement around a rotating shaft and includes a primary ring and a mating ring. The primary ring is axially shiftable relative to the rotating shaft and the mating ring is axially fixable relative to the rotating shaft. The seal also includes a biasing mechanism that urges the primary ring toward the mating ring and an annular flexible sealing membrane.

The mating ring can include a recirculating groove pattern as more fully set forth below.

In one embodiment, a mechanical seal assembly adapted for arrangement around a rotating shaft is disclosed. The seal assembly includes: a primary ring and a mating ring, the primary ring being axially shiftable relative to the rotating shaft and the mating ring being axially fixable relative to the rotating shaft; and a biasing mechanism that urges the primary ring toward the mating ring. The mating ring includes a face that defines an inner diameter and an outer diameter. The face includes a channel formed therein disposed between the inner diameter and the outer diameter; one or more inlet channels formed in the face that extend from the inner diameter to the channel; and one or more spiral grooves in fluid communication with the channel that extend from the channel toward the inner diameter.

According to any prior embodiment, the face can be configured to rotate in a counterclockwise direction.

According to any prior embodiment, the one or more inlet channels can extend from the inner diameter in a clockwise direction.

According to any prior embodiment, the one or more spiral grooves channels can extend from the channel in the counterclockwise direction.

According to any prior embodiment, the one or more spiral grooves can each include an entry end that is fluidly connected to the channel and a tip.

According to any prior embodiment, the tip can be narrower than the entry end and be closer to the root dam than the entry end.

According to any prior embodiment, the channel has first depth and the one or more spiral grooves has a depth that is smaller than the first depth.

According to any prior embodiment, the first depth is at least two times greater than the depth of the spiral grooves.

Also disclosed is a mating ring for use in a dry gas seal. The mating ring can have any of the features of the mating of the prior disclosed seal Also disclosed is second mechanical seal assembly adapted for arrangement around a rotating shaft. This seal assembly includes: a primary ring and a mating ring, the primary ring being axially shiftable relative to the rotating shaft and the mating ring being axially fixable relative to the rotating shaft; and a biasing mechanism that urges the primary ring toward the mating ring. The mating ring includes a face that defines an inner diameter and an outer diameter. The face in this embodiment includes: a channel formed therein disposed between the inner diameter and the outer diameter; one or more inlet channels formed in the face that extend from the outer diameter to the channel; and one or more spiral grooves in fluid communication with the channel that extend from the channel toward the outer diameter.

According to any prior second assembly embodiment, the face is configured to rotate in a clockwise direction.

According to any prior second assembly embodiment, the one or more inlet channels extend from the outer diameter in a counterclockwise direction.

According to any prior second assembly embodiment, the one or more spiral grooves channels extend from the channel in the counterclockwise direction.

According to any prior second assembly embodiment, the one or more spiral grooves each include an entry end that is fluidly connected to the channel and a tip.

According to any prior second assembly embodiment, the tip is narrower than the entry end and is closer to the root dam than the entry end.

According to any prior second assembly embodiment, the channel has first depth and the one or more spiral grooves has a depth that is smaller than the first depth.

According to any prior second assembly embodiment, the first depth is at least two times greater than the depth of the spiral grooves.

Also disclosed is a mating ring for use in a dry gas seal. The mating ring can have any of the features of the mating of the prior disclosed second seal.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the terms "coupled", "connected" and variations thereof describes having a path for a fluid between two elements and does not imply a direct connection between the elements with no intervening elements/connections between them. However, all connections or couplings can be direct if specifically called out the claims and all instances of such connections/connections can include the description that the connection/coupling (or similar terms) are direct. All of these variations are considered a part of the specification.

DETAILED DESCRIPTION

A detailed description of one or more embodiments of the disclosed apparatus and method are presented herein by way of exemplification and not limitation with reference to the Figures.

Turning now to an overview of technologies that are more specifically relevant to aspects of the invention a seal is disclosed that can be used either as a stand-alone seal for any machine that includes a rotating shaft or as back-up in such machines. Example of such machines include pumps, mixers, blenders, agitators, compressors, blowers, fans or the like. In one embodiment, the gas used to create barrier at the seal interface can be ambient air as will be more fully understood from the below.

In the case where the seal is a "back-up" (or "containment") seal, the primary seal can be any type of rotating seal that can create a seal around a rotating shaft and that includes two faces/rings that are rotatable relative to one another. In the case where the seal is a stand-alone or primary seal, ambient air or process gas can be used to create a barrier at the seal interface to keep a gas in a chamber of a rotating machine such as a compressor. At technical effect is that what ever gas is used, to create the gas film, that gas is pumped back where it came from. For example, if the seal face draws gas from the inner diameter of the seal face, whatever gas is drawn from the inner diameter is used to create the film/barrier and then is returned to the location it was drawn from (see, e.g., FIG. 5). In such a case, the gas is typically air but that is not required. As an alternative, if the seal face draws gas from the outer diameter of the seal face, whatever gas is drawn from the outer diameter is used to create the film/barrier and then is returned to the location it was drawn from (see, e.g., FIG. 6). In such a case, the gas is typically process gas but that is not required.

Figure 1:
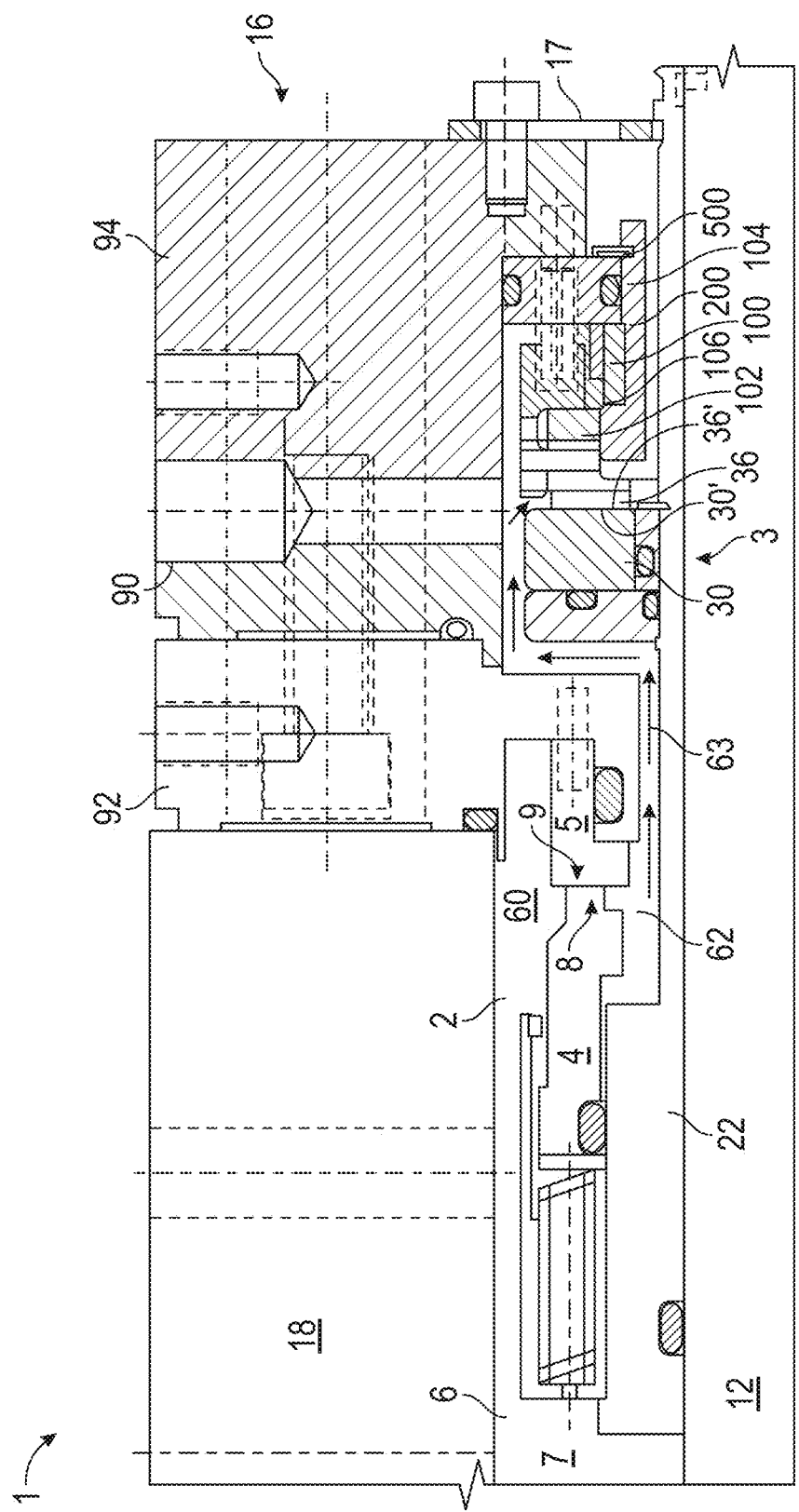
FIG. 1 is a cross-sectional view depicting a portion of a seal assembly that includes two seals including a primary seal formed as contacting O-ring pusher type seal and second or containment seal formed as a non-pusher seal that includes non-collapsible flexible sealing membrane. The groove pattern disclosed herein can be used in either type of seal and the seal could be standalone seal or a combination of two seals as shown.

Referring now to FIG. 1, illustrated of an embodiment of mechanical seal assembly 1 according to one embodiment. The mechanical seal assembly includes first and second seals, 2, 3. As shown, a first seal 2 is arranged so that it located inboard for the second seal 3 of FIG. 1. The terms first and second can be replaced with terms primary and containment or back-up, respectively. It shall be understood that included instances the first and second seals can the same or similar to one another. For example, in FIG. 1, the first seal 2 may be referred to as primary seal and the second seal 2 referred to as a containment seal. In some instances, the second seal can be used by itself and in such a case may be referred to as the first or primary seal.

Referring back to FIG. 1, the illustrated assembly 1 has the primary seal 2 illustrated as an O-ring type pusher seal and the containment seal 3 illustrated as a seal that includes an annular flexible sealing membrane 100. Of course, the first seal 2 could also include an annular flexible sealing membrane. Similarly, the containment seal 3 could be O-ring type pusher seal. Further, the teachings herein are not limited solely to these two types of seal and could be provided for any type of dry gas or dry running seal.

The assembly 1 of FIG. 1 (as well as all other assemblies of seals or individual seal shown herein) can be a freestanding assembly or can be assembled and inserted into a bore 6 formed in a rotary machine such that it surrounds a rotating shaft 12 of that machine. For simplicity, only an annular housing 18 of the machine is illustrated but this shall serve as illustration of any machine type.

The assembly 1 seals a fluid in a chamber 7. Herein, the seal assembly 1 can provide a seal for the chamber 7 at the inboard extent of the seal assembly 1 with respect to the ambient surroundings 16.

The illustrated primary seal 2 includes two rings 4, 5 having opposing faces 8, 9 that rotate relative to one another in operation. While further explanation may be given below, the primary seal 2 in FIG. 1 operates in accordance with a typical O-ring pusher seal.

In one embodiment the primary seal 2 can be a lubricated mechanical seal that allows a liquid film to develop between the faces as the faces rotate relative to one another. The liquid is received from the chamber 7 and is generally held in inboard side 60 of the location where the faces 4/5 meet. In one non-limiting example, some of the liquid will lubricate the faces and, as will all such seals, a small amount of liquid may pass (leak) between the faces during operation. In the case where the liquid is a light end, leakage through primary seal 2 turns to vapor. Thus, on the outboard side 62 of the primary seal 2, the light end exits in a gas/vapor form.

The containment seal 3 is fluid communication with the outboard side 62 of the primary seal 2. The unlabeled arrows in FIG. 1 show the path of a fluid (gas or liquid) that passes through the primary seal 2 (e.g., the path of gas/liquid on the outboard side 62 and within the assembly 1).

In one embodiment, at least one of the two seal faces 30', 36' can include recirculating grooves as discussed herein to keep any gas at the outboard side 62 contained by the containment seal 3 which operates as dry running seal where the faces are separated by a film of gas. In the case where the seal 3 is operated alone as a primary seal, the seal faces 30', 36' will serve to seal process gas in the chamber 7.

For sake of completeness is can be noted that the containment seal 3 can be implemented dry running non-contacting seal that includes a non-collapsible bellows as shown in FIG. 1. However, this is not required.

In FIG. 1 the non-collapsible bellows is shown as the annular flexible sealing membrane 100. The annular flexible sealing membrane 100 is non-collapsible and can be supported, for example, by a stub sleeve 200. As more fully described below, because the annular flexible sealing membrane 100 does not have a relative motion against stub sleeve 200, it does not wear out like the tradition O-Rings.

In this context (and as more fully shown below) the containment seal 3 includes a primary (or axially shiftable) ring 36 and a mating ring 30. The primary ring 36 is axially shiftable relative to the rotating shaft 12 and the mating ring 30 is axially fixable relative to the rotating shaft 12. One of these both rings include faces (e.g., faces 36' and 30') and one of them can have either uni-directional or bi-directional grooves formed therein. Examples of prior art uni-directional grooves 72 are shown on a seal face (either face 36' or face 30') in FIG. 3 and bi-directional grooves 74 are on are shown on a seal face (either face 36' or face 30') in FIG. 4.

Herein disclosed is a new recirculating groove pattern that can be used where no contained gas is allowed to pass between the faces of the rings. The pattern can create the seal from either air (e.g., FIG. 5) or from the gas being sealed (e.g., FIG. 6).

A biasing mechanism 500 (e.g., a spring) urges the primary ring 36 toward the mating ring 30. The annular flexible sealing membrane 100 illustrated in FIG. 1 and further discussed below includes a flange portion 102 disposed at least partially between the biasing mechanism 500 and the primary ring 36, a coaxial portion 104 that is axially fixable relative to the shaft 12 and a flexible connection portion 106 that connects the flange portion 102 to the coaxial portion 104. Further details of the annular flexible sealing membrane 100 are provided below.

As illustrated, the seal assembly 1 is disposed in the bore 6 formed in the annular housing 18. In more detail, an annular sleeve member 22 is fixedly attached to the shaft 12 and rotates therewith. In the example shown in FIG. 1, regarding the primary seal 2, the first or primary ring 4 is carried on the annular sleeve member 22 and the second or mating ring 5 is carried by a carrier ring 92 that, in operation, can be fixedly attached to the annular housing 18. In this example, a primary or first seal biasing mechanism 502 urges the primary and secondary rings 4, 5 of the primary seal together. In particular, the primary or first seal biasing mechanism 502 is connected to the primary ring 4 and urges is towards the mating ring 5. Of course, this configuration could be reversed without departing from the teachings herein.

A containment seal carrier 94 carries the primary ring 36 of the secondary seal as well as the stub 200, the biasing mechanism 500 and annular flexible sealing membrane 100. The containment seal carrier 94 can be referred to as gland plate and may be the same or similar to the gland plate 20 described below. Similar to the primary ring 4, the mating ring 30 of the containment seal 3 is carried by and rotates with the annular sleeve member 22. The containment seal carrier 94 and the carrier ring 92 can be joined together to form a cartridge in this and other embodiments. The cartridge so formed can be connected to the annular housing 18 in this and other embodiments. In some instances, the cartridge can include and end plate 17 that joins the containment seal carrier 94 to the annular sleeve member 22. The cartridge can define the containment cavity 23 in one embodiment.

A more detailed example of a seal that includes an annular flexible sealing membrane 100 will now be described. The description will include a version of such a seal that while it may have different looking primary and mating rings than the containment seal 3 of FIG. 1, the same principles apply. It should be noted, however, that the containment seal 3 of FIG. 1 does not include an anti-extrusion ring. This does not mean that such could not be included in the containment seal 3 of FIG. 1 but, rather that it can be omitted.

Figure 2:
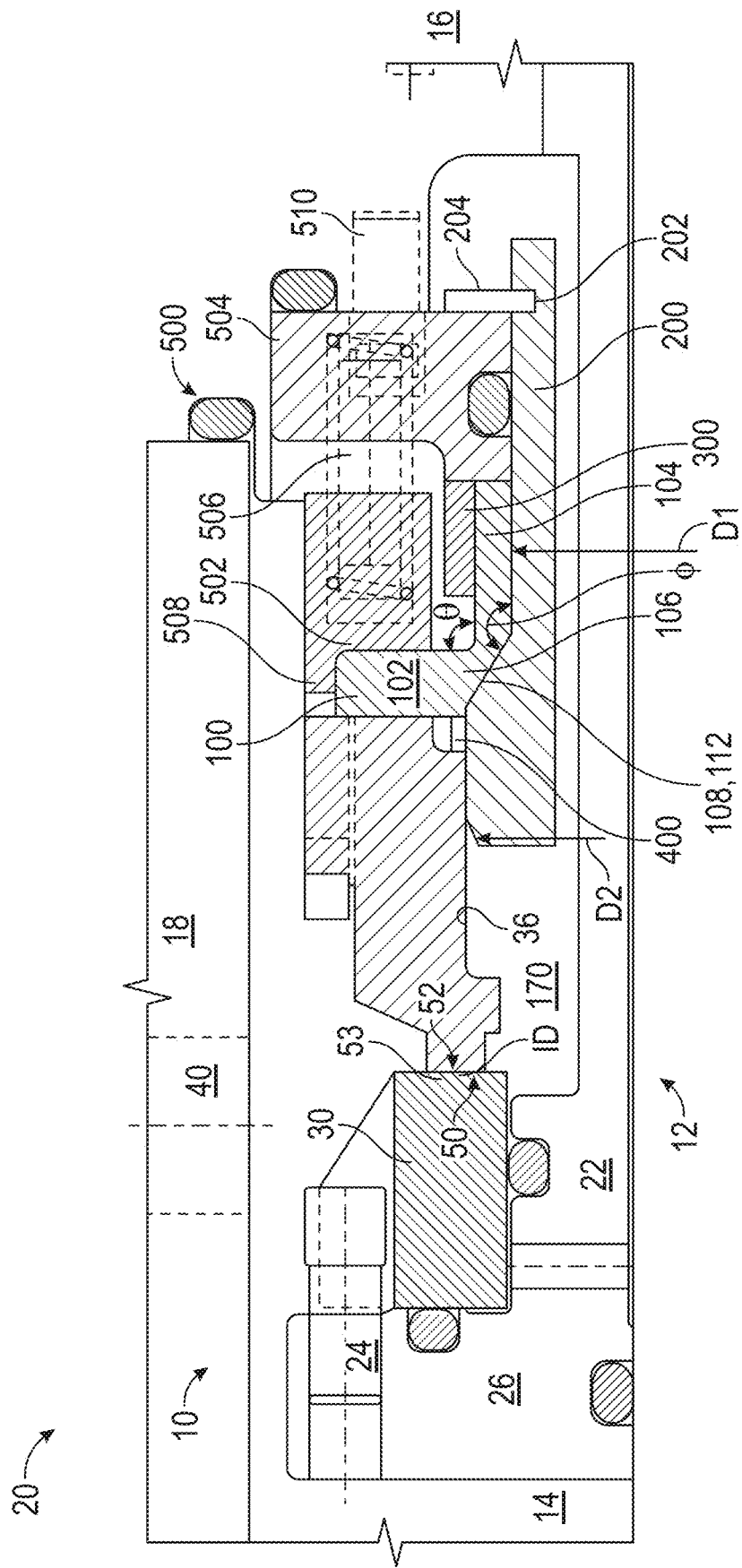
FIG. 2 is a cross-sectional view depicting a portion of a seal assembly that includes non-collapsible flexible sealing membrane according to an embodiment. However, the teachings herein can be used in any type of dry gas seal.

FIG. 2 is a cross-sectional views depicting a portion of a seal assembly including a flexible, non-collapsible, sealing membrane 100 depicted in conjunction with an article of rotary shaft equipment. This seal can be either the primary or containment seal of FIG. 1 and is not limited to the non-pusher seal as illustrated.

As is common for seal assemblies of this type, seal assembly 10 can seal a rotating, axially extending, shaft 12 of an article of rotary shaft equipment. Seal assembly 10 can provide a seal for the process chamber 14 at the inboard extent of the seal assembly 10 with respect to the ambient surroundings 16. The air in the ambient surroundings 16 can travel into a containment chamber 170 that is shown at an inner diameter of the seal interface 53

With reference again to both FIGS. 1 and 2, the skilled artisan will realize that the process chamber 14 can be either the chamber 7 (in the event only one seal is provided) or the containment chamber 63 described in FIG. 1.

The seal assembly 10 can be arranged coaxial of the shaft 12 in a bore defined by an annular housing 18 coaxial of shaft 12. Various stationary (or non-rotating) components of seal assembly 10 can be operably coupled to housing 18, or a gland plate 20, which is in turn also operably coupled to housing 18.

Various rotating components can be operably coupled to shaft 12, for rotation therewith. An annular sleeve member 22 is secured to the shaft 12 for rotation therewith. An annular flange formation 26 extends radially outwardly of the annular sleeve member 22 at the end thereof adjacent the process chamber 14. A plurality of annularly spaced pins 24 can extend axially through bores in sleeve flange 26.

An axially fixed seal ring 30 (or mating ring) is mounted on the face of sleeve flange 26 remote from the process chamber 14, for rotation therewith. Annular O-ring 32 provides a resilient secondary seal between annular sleeve member 22 and axially fixed seal ring 30. In embodiments, more or fewer secondary sealing O-rings may be present. Axially fixed seal ring 30 includes outboard sealing face 50.

An axially shiftable seal ring 36 (or primary ring) is arranged outboard and adjacent to axially fixed seal ring 30. The axially shiftable seal ring 36 includes an inboard sealing face 52. The inboard sealing face 52 abuts the outboard sealing face 50. Sealing faces 50, 52 can correspond to the sealing faces 30', 36' from FIG. 1. The location where the sealing faces is shown as seal interface 53.

While, as depicted and described, the axially shiftable seal ring 36 is stationary and the axially fixed seal ring 30 is rotatable, in embodiments, the relative axial movement can be provided by either the rotating or stationary seal ring.

When used as a primary or single seal, an optional passage 40 can be defined within housing 18 and/or gland plate 20 to provide a sealing lubricant (not shown) to sealing faces 50 and 52. When used as a containment seal, the passage can be a vent such as vent 90 described above.

The annular bellows/sealing membrane) 100 can present a generally L-shaped cross-section, comprising a first, generally radially outward extending, flange portion 102 and a second, generally axially outboard extending, coaxial portion 104. The flange portion 102 and the coaxial portion 104 can be operably coupled by a flexible connecting portion 106. An inboard face of the flange portion 102 can abut and outboard face of axially shiftable seal ring 36, creating a pressure tight seal. The coaxial portion 104 is substantially or entirely radially inward of the balance diameter of the seal, where the pressure differential across the seal is the greatest. The flexible connecting portion 106 can present an angular facet 108 at a radially inward side and a connecting angle θ between flange portion 102 and coaxial portion 104 at a radially outward side. In embodiments, angle θ can be approximately ninety degrees, though other angles may also be used. The flexible connecting portion 106 can present a thinner cross section than flange portion 102 or coaxial portion 104 to enable stretching and compression.

The angular facet 108 can terminate at a corner 110 at a radially inward extent of the flexible connecting portion 106. The facet 108 can present an angle ϕ, relative to the axial axis of between about 100° to about 150°. The sealing member 100 is non-collapsible and can comprise a flexible material. Example flexible materials include elastomers such as nitrile, fluroreslastomer, and ethylene propylene rubbers, though other materials can be used.

The coaxial portion 104 can be fixed to an annular stub sleeve 200 by an annular band 300. The stub sleeve 200 has a first outer diameter D1, a second outer diameter D2 and an angled surface 112 connecting the first outer diameter to the second outer diameter. D2 is greater than D1. Radially outward directed faces (D1, angled surface 112 and D2) of stub sleeve 200 can abut coaxial portion 104, facet 108, and axially shiftable seal ring 36, respectively. In this manner, if the event of a pressure spike, the stub sleeve 200 provides a rigid support for the annular flexible sealing membrane 200 so that it is does not collapse in the manner of a convoluted elastomer as described above.

The stub sleeve 200 can present groove 202 to receive snap ring 204 to locate stub sleeve axially relative to a carrier 504 (discussed below). The carrier 504 can be attached, for example, to the containment seal carrier 94 of FIG. 1. In embodiments, the stub sleeve 200 can be located radially by a snap ring 204, hydraulic pressure, or interference fit with the carrier 504 (discussed below) or other components of seal assembly 10. The stub sleeve 200, band 300, and the snap ring 204 can comprise steel or stainless steel in embodiments.

The annular anti-extrusion ring 400 can be present in an annular groove of axially shiftable seal ring 36 and abut axially shiftable seal ring 36, stub sleeve 200, and sealing member 100. The annular anti-extrusion ring 400 can comprise a harder elastomer than sealing membrane 100, such as a 50 to 55 (Shore D) durometer carbon filled polytetrafluoroethylene (PTFE). Because extrusion is most likely at the balance diameter of the seal, the inner diameter of anti-extrusion ring 400 can be arranged at the balance diameter of the seal. As discussed above, in some embodiments, this ring can be omitted. An example of such an embodiment is shown in FIG. 1 by containment seal 3.

The biasing mechanism 500 can abut the flange portion 102. The biasing mechanism 500 can comprise an axially shiftable annular retainer 502, the axially fixed carrier 504, and one or more biasing members 506 spanning therebetween. The retainer 502 can be arranged proximate flange portion 102. The retainer 504 can present a protrusion 508, extending axially inboard outside the outer diameter of the flange portion 102. The protrusion 508 can be radially spaced from the outer face of the flange portion 102. The carrier 504 can be axially and rotationally fixed to the gland plate 20 by one or more pins 510, though other fixation mechanisms can be used. The biasing members 506 can comprise one or more radially spaced springs, though other biasing mechanisms known in the art can be used. In embodiments, one or both of the retainer 502 and the carrier 504 can include bores adapted to house at least part of each biasing member 506, such that biasing members 506 are partially located within retainer 502 and carrier 504.

Those of ordinary skill in the art will appreciate that the arrangements depicted in FIG. 2 include components that may be altered or eliminated in other seal assembly embodiments. In addition, more or fewer components may be incorporated in other embodiments of seal assemblies according to the present disclosure.

In operation, rotation of shaft 12 can drive annular sleeve member 22 and axially fixed seal ring 30 to rotate relative to axially shiftable seal ring 36.

The pressure gradient and hydraulic pressure created by the relative rotation of sealing faces 50 and 52 can result in an opening force, urging axially shiftable seal ring 36 axially outboard from axially fixed seal ring 30. Similarly, a closing force can be provided by biasing mechanism 500, urging axially shiftable seal ring 36 inboard toward axially fixed seal ring 30.

Figure 4:
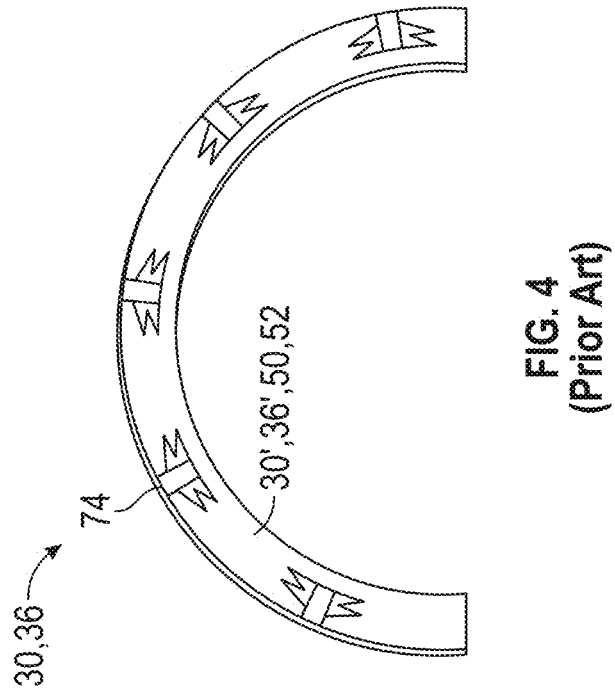
FIG. 4 shows an example of a prior art face of a seal ring that includes bi-directional grooves.
Figure 3:
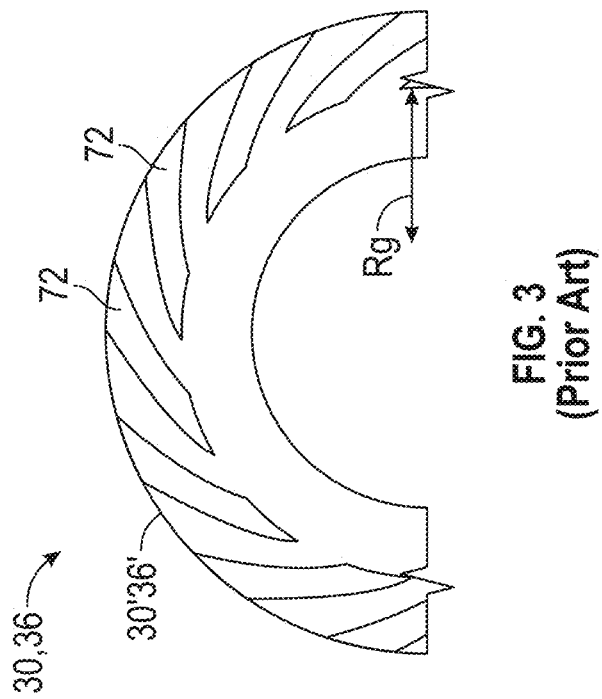
FIG. 3 shows an example of a prior art face of a seal ring that includes uni-directional grooves.

Grooves such as those shown in FIGS. 3 and 4 are know in the art and generally are effective at creating a seal. However, in such cases some leakage can occur across the seal interface 53. The grove patterns of FIGS. 5 and 6 may applied to a mechanical shaft face seal that dynamically provides lift-off and non-contacting operation without allow for (or reducing) such leakage.

In general, the spiral groove pattern disclosed herein can be applied to the mating ring seal face. The pattern incorporates a circumferential channel with relief paths that extend from the channel to the mating ring ID, Logarithmic spiral grooves that extend from the circumferential channel inward towards the seal face ID and that stop a distance (e.g., 1/16" radially) from the face ID. A sealing dam extends from the circumferential channel outward to the face OD. In one embodiment, the channel and relief paths are deeper that the grooves. For example, they can be twice as deep as the spiral grooves. In an alternative embodiment the sealing dam can be at the OD and the spiral grooves pump outward from the channel towards the OD.

Figure 5:
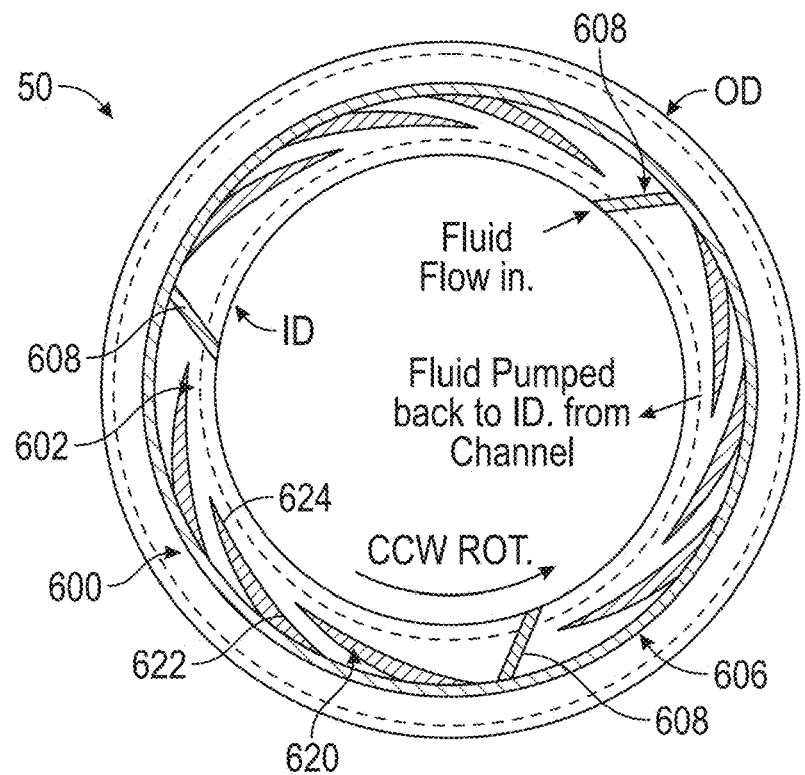
FIG. 5 shows an example of a face of a seal ring according to one embodiment that recirculates gas from the inner diameter of the face into a seal interface and back to the inner diameter.

FIG. 5 shows an example of seal face 50 that is generally circular and shape. The seal face 50 draws air from an inner diameter (ID) thereof. In the following discussion it shall be assumed that the seal face 50 rotates in a counterclockwise direction as in indicated in FIG. 5. From time to time herein, the certain directions will be given relative to the rotational direction. Those directions can be reversed herein without departing from the disclosed embodiments.

The seal face 50 defines an inner diameter ID and an outer diameter OD. In this example it shall be assumed that a process gas that is being sealed in a chamber is provided at the OD. As is customary in the art, the seal face 50 can include a seal dam 600 that is level with the face 50. The seal face 50 can also include a root dam 602 located closer to the ID of the seal face 50 than the seal dam 602. Stated differently, the root dam 602 can be located further from the OD of the seal face 50 than the seal dam 600.

The seal face 50 includes a channel 606 formed therein. The channel 606 can be formed in the seal face 50 such that is has first depth measured downwardly from the seal face 50. The channel 606 can be located between the root dam 602 and seal dam 600. The channel 606 is shown as being generally circular is shape but other configurations are possible.

The seal face 50 also includes one or more inlet channels 608 formed therein that extend from the inner diameter ID to the channel 606. As shown, the face includes three inlet channels 608 by way of example only. In one embodiment, the one or more inlet channels 608 are evenly spaced about the seal face 50. The inlet channels 608 can have a depth. The depth can be same as the first depth (e.g., the depth of the channel 604).

The inlet channels 608 as illustrated, extend from the channel 606 in a direction that that matches the rotation direction. That is, the inlet channels as shown can extend from the channel 606 in the counterclockwise direction. Stated differently, the inlet channels 608 can extend from the inner diameter ID to the channel 606 in the clockwise direction.

In operation, gas moves from the ID through the inlet channels 608 and into the channel 606 due to rotation of seal face 50.

The seal face 50 also includes one or more spiral grooves 620 formed thereon. Spiral grooves 620 include an entry end 622 that is fluidly connected to the channel 606. The spiral grooves 622 also include and terminate at a tip 624 that is smaller than the entry end 622. The tips 624 can be at or near the root dam 602.

The grooves 620 extend from the channel toward the ID in a direction that is opposite the rotation direction (in this case, in the clockwise direction). The narrowing nature of the grooves 620 cause the formation of a gas film from the gas in channel 606. The formation of such a gas film is generally due to the fact that gas is compressible and is generally referred to as "lift-off."

In operation, a gas at the ID of the face 50 travels into the channel 606 via the inlet channels 608 and then enters the grooves 620. As the gas is passed into the tips 624 it causes the seal face 50 to lift-off from an adjacent face and returns the gas back to the ID. In this manner, a gas at the OD is not allowed to pass over the face 50.

As shown, there are nine (9) spiral grooves 620 but other numbers could be used.

In one example, the groove/channel pattern is applied to the mating ring seal face. The channel 604 is circumferential and the spiral grooves are logarithmic and can extend from the channel inward towards the ID stopping 1/16" radially from the ID. The sealing dam can have a width of about 1/10" and extend from the channel 604 outward to OD. The face 50 can have a radial face width of 0.390" and the channel is. 062" radially inward from the OD.

Figure 6:
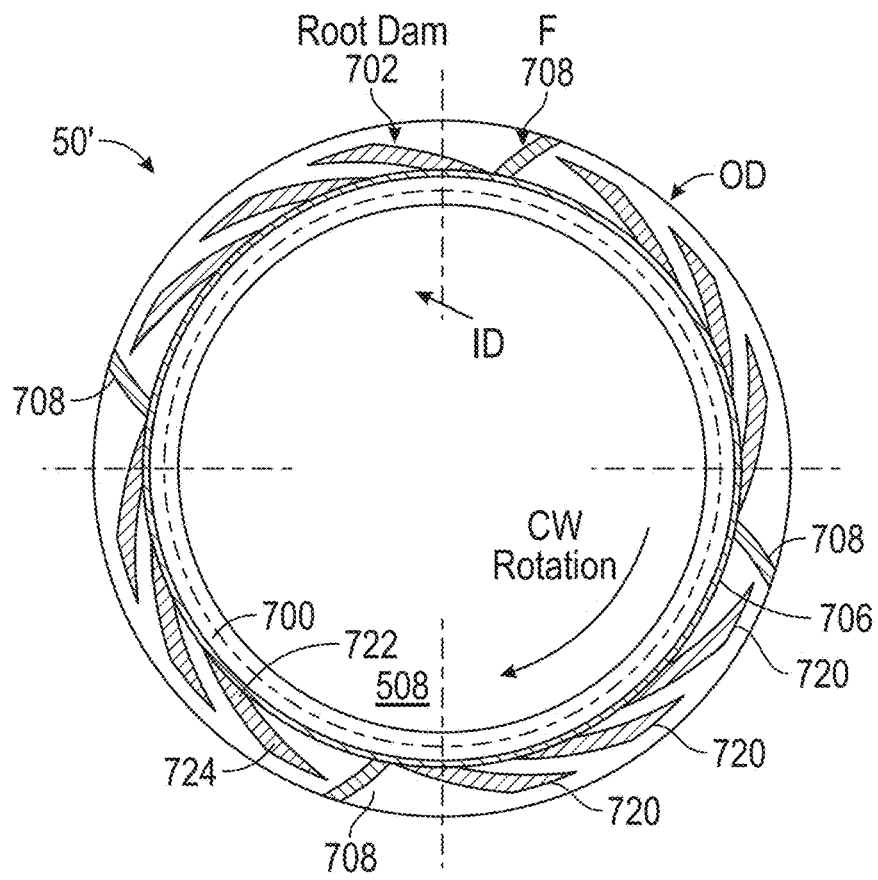
FIG. 6 shows an example of a face of a seal ring according to one embodiment that recirculates gas from the outer diameter of the face into a seal interface and back to the outer diameter.

FIG. 6 shows an example of seal face 50' that is generally circular and shape. The seal face 50' draws air from the outer diameter OD thereof. In the following discussion it shall be assumed that the seal face 50' rotates in a clockwise direction as in indicated in FIG. 6. From time to time herein, the certain directions will be given relative to the rotational direction. Those directions can be reversed herein without departing from the disclosed embodiments.

The seal face 50' defines an inner diameter ID and an outer diameter OD. In this example it shall be assumed that a process gas that is being sealed in a chamber is provided at the OD. As is customary in the art, the seal face 50' can include a seal dam 700 that is level with the face 50'. The seal face 50' can also include a root dam 702 located closer to the OD of the seal face 50' than the seal dam 700. Stated differently, the root dam 702 can be located closer to the OD of the seal face 50' than the seal dam 700.

The seal face 50' includes a channel 706 formed therein. The channel 706 can be formed in the seal face 50' such that is has first depth measured downwardly from the seal face 50'. The channel 706 can be located between the root dam 702 and seal dam 700. The channel 706 is shown as being generally circular is shape but other configurations are possible.

The seal face 50' also includes one or more inlet channels 708 formed therein that extend from the outer diameter OD to the channel 706. As shown, the face includes four inlet channels 708 by way of example only. In one embodiment, the one or more inlet channels 708 are evenly spaced about the seal face 50'. The inlet channels 708 can have a depth. The depth can be same as the first depth (e.g., the depth of the channel 706).

The inlet channels 708 as illustrated, extend from the channel 504 in a direction that that matches the rotation direction. That is, the inlet channels as shown can extend from the channel 706 in the clockwise direction. Stated differently, the inlet channels 708 can extend from the outer diameter ID to the channel 706 in the counterclockwise direction.

In operation, gas moves from the OD through the inlet channels 708 and into the channel 706 due to rotation of seal face 50'.

The seal face 50' also includes one or more spiral grooves 720 formed thereon. Spiral grooves 720 include an entry end 722 that is fluidly connected to the channel 706. The spiral grooves 722 also include and terminate at a tip 724 that is smaller than the entry end 722. The tips 724 can be at or near the root dam 702.

The grooves 720 extend from the channel toward the OD in a direction that is opposite the rotation direction. In the illustrated case the grooves extend in the counterclockwise direction. The narrowing nature of the grooves 720 cause the formation of a gas film from the gas in channel 706. The formation of such a gas film is generally due to the fact that gas is compressible and is generally referred to as "lift-off."

In operation, a gas at the OD of the face 50' travels into the channel 706 via the inlet channels 708 and then enters the grooves 720. As the gas is passed into the tips 524 it causes the seal face 50' to lift-off from an adjacent face and returns the gas back to the OD. In this manner, a gas at the OD is not allowed to pass over the face 50'.

As shown, there are nine (9) spiral grooves 520 but other numbers could be used.

Any of the channels herein can have a depth that is two or more times larger than the depth of the grooves. For example, the grooves could have a depth of 0.000180 inches. and the channels (one or both the channel and the inlet channels) could have depth of 0.000360 inches.

One possible technical effect of the recirculating spiral groove design shown herein is that it eliminates transverse flow or leakage. This is a significant improvement for applications where process fluid leakage is not acceptable and dry running, non-contacting operation is desired. Versus contacting face seal designs the recirculating spiral groove design provides significant improvements in seal face heat generation, torque requirement, face wear and long-term sealing ability.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A mechanical seal assembly adapted for arrangement around a rotating shaft, the seal assembly comprising:
    a primary ring and a mating ring, the primary ring being axially shiftable relative to the rotating shaft and the mating ring being axially fixable relative to the rotating shaft; and
    a biasing mechanism that urges the primary ring toward the mating ring;
    wherein the mating ring includes a face that defines an inner diameter and an outer diameter, wherein the face includes:
        a channel formed therein disposed between the inner diameter and the outer diameter;
        one or more inlet channels formed in the face that extend from the inner diameter to the channel in a clockwise direction; and
        one or more spiral grooves in fluid communication with the channel that extend from the channel toward the inner diameter in the clockwise direction.

2. The assembly of claim 1, wherein the face is configured to rotate in a counterclockwise direction.

3. The assembly of claim 1, wherein the one or more spiral grooves each include an entry end that is fluidly connected to the channel and a tip.

4. The assembly of claim 3, wherein the face includes a root dam and seal dam and the channel is located between the root dam and seal dam, wherein the tip is narrower than the entry end and is closer to the root dam than the entry end.

5. The assembly of claim 1, wherein the channel has first depth and the one or more spiral grooves has a depth that is smaller than the first depth.

6. The assembly of claim 5, wherein the first depth is at least two times greater than the depth of the spiral grooves.

7. A mating ring for use in a dry gas seal, the mating ring comprising:
    a face that defines an inner diameter and an outer diameter, wherein the face includes:
        a channel formed therein disposed between the inner diameter and the outer diameter;
        one or more inlet channels formed in the face that extend from the inner diameter to the channel in a clockwise direction; and
        one or more spiral grooves in fluid communication with the channel that extend from the channel toward the inner diameter in the clockwise direction.

8. The mating ring of claim 7, wherein the face is configured to rotate in a counterclockwise direction.

9. The mating ring of claim 8, wherein the one or more inlet channels extend from the inner diameter in a clockwise direction.

10. The mating ring of claim 7, wherein the tip is narrower than the entry end.

11. The mating ring of claim 7, wherein the channel has first depth and the one or more spiral grooves has a depth that is smaller than the first depth.

12. The mating ring of claim 11, wherein the first depth is at least two times greater than the depth of the spiral grooves.

13. A mechanical seal assembly adapted for arrangement around a rotating shaft, the seal assembly comprising:
   a primary ring and a mating ring, the primary ring being axially shiftable relative to the rotating shaft and the mating ring being axially fixable relative to the rotating shaft; and
   a biasing mechanism that urges the primary ring toward the mating ring;
   wherein the mating ring includes a face that defines an inner diameter and an outer diameter, wherein the face includes:
      a channel formed therein disposed between the inner diameter and the outer diameter;
      one or more inlet channels formed in the face that extend from the outer diameter to the channel in a counterclockwise direction; and
      one or more spiral grooves in fluid communication with the channel that extend from the channel toward the outer diameter in the counterclockwise direction.

14. The assembly of claim 13, wherein the face is configured to rotate in a clockwise direction.

15. The assembly of claim 13, wherein the one or more spiral grooves each include an entry end that is fluidly connected to the channel and a tip.

16. The assembly of claim 15, wherein the tip is narrower than the entry end.

17. The assembly of claim 13, wherein the channel has first depth and the one or more spiral grooves has a depth that is smaller than the first depth.

18. The assembly of claim 17, wherein the first depth is at least two times greater than the depth of the spiral grooves.

19. A mating ring for use in a dry gas seal, the mating ring comprising:
   a face that defines an inner diameter and an outer diameter, wherein the face includes:
      a channel formed therein disposed between the inner diameter and the outer diameter;
      one or more inlet channels formed in the face that extend from the outer diameter to the channel in a counterclockwise direction; and
      one or more spiral grooves in fluid communication with the channel that extend from the channel toward the outer diameter in the counterclockwise direction.

20. The mating ring of claim 19, wherein the face is configured to rotate in a clockwise direction.

21. The mating ring of claim 19, wherein the one or more spiral grooves each include an entry end that is fluidly connected to the channel and tip.

22. The mating ring of claim 21, wherein the tip is narrower than the entry end.

23. The mating ring of claim 19, wherein the channel has first depth and the one or more spiral grooves has a depth that is smaller than the first depth.

24. The mating ring of claim 23, wherein the first depth is at least two times greater than the depth of the spiral grooves.

* * * * *